United States Patent

Puyplat

[11] 4,092,071
[45] May 30, 1978

[54] PHOTOELECTRIC DETERMINATION OF THE CUT-OFF OF A LIGHT BEAM FROM A MOTOR VEHICLE HEADLAMP

[75] Inventor: Olivier Puyplat, Paris, France
[73] Assignee: Cibie Projecteurs, Bobigny, France
[21] Appl. No.: 668,170
[22] Filed: Mar. 18, 1976
[30] Foreign Application Priority Data
Apr. 1, 1975 France .................. 75 10095
[51] Int. Cl.² .................. G01J 1/00
[52] U.S. Cl. .................. 356/121
[58] Field of Search .................. 356/121, 122
[56] References Cited
U.S. PATENT DOCUMENTS

| 3,386,333 | 6/1968 | Preston | 356/122 |
| 3,467,473 | 9/1969 | Preston | 356/122 |
| 3,746,449 | 7/1973 | Schick | 356/121 |

Primary Examiner—John K. Corbin
Assistant Examiner—R. A. Rosenberger
Attorney, Agent, or Firm—Alan H. Levine

[57] ABSTRACT

The invention relates to methods and devices for determining the position of the cut-off of the light beam from a motor vehicle headlight. A pair of light detectors $D_c$ and $D_1$ are located on a screen and the headlight and screen moved relatively to one another until the light intensities $I_c$ and $I_1$ satisfy the relation $$I_c = aI_1 + b$$

where $a$ and $b$ are given parameters such that when the said relation is satisfied, the position of the cut-off is indicated by the position of the detecting system $D_c$.

8 Claims, 3 Drawing Figures

PHOTOELECTRIC DETERMINATION OF THE CUT-OFF OF A LIGHT BEAM FROM A MOTOR VEHICLE HEADLAMP

FIELD OF THE INVENTION

The invention relates to motor vehicle lighting, and more particularly to the determination of the cut-off of a light beam coming from a motor vehicle headlamp, inter alia a dipped or fog-lamp beam.

BACKGROUND OF THE INVENTION

In the art of motor vehicle lighting, it is well known to provide headlamps with means for limiting the light beam to have a so called cut-off so that its rays cannot blind the driver of a vehicle moving in the opposite direction.

There are precise standards regulating the various amounts of lighting which are permissible at different points in space around the optical axis of the headlamp. In testing for this purpose, the illumination provided by the headlamp is located on a screen, which is usually at right angles to the optical axis and at a given distance from the headlamp. Each point of the image on the screen can be located by the vertical and horizontal angular distance (relative to the projector) between it and the central point on the optical axis of the headlamp.

Usually, the headlamp beam is cut off in such a manner that the screen shows a very marked separation between a bright illuminated region and a dark non-illuminated region, the separation forming a material representation of the cut-off. According to European Standards laid down in 1957, (for left-hand drive vehicles) the cut-off appears as a bent line comprising a horizontal segment at the left of the central axis of the headlamp, and a segment sloping upwards at 15° to the right of the central axis. Other forms of cut-off may be used, e.g. rectilinear cut-off (before 1957) or "offset" cut-off, as described by the Applicants in their French Pat. No. 7346304.

Basically, the problem of determining the position of the cut-off on a vehicle headlamp is part of the problem of adjusting the headlamps, either when first installed on the vehicle or during use.

Numerous checking and/or adjusting devices have been proposed and used. They nearly all comprise a screen for intercepting the light beam to be checked, and means for moving the screen relative to the headlamp, see e.g. French Pat. Nos. 825653 and 1087394.

In the simplest devices, the screen comprises a material representation of the cut-off, which is determined by making the light-shade limit appearing on the screen coincide with the material representation. Either the screen can be moved relative to a reference position to locate the cut-off or, as is done inter alia in devices sold in France under the trademark "REGLOSCOPE", the headlamp can be adjusted so that the projected cut-off coincides with the represented cut-off.

In some more elaborate devices, it has been proposed to use photoelectric detectors to convert the light intensities at different points on the screen into useful electric signals. If a screen on to which a cut-off beam is projected is vertically scanned upwards, the light intensity varies very rapidly from very high to very low when the cut-off is crossed. Thus, if the variation in light intensity with height is measured by means of one or more detectors, it is theoretically easy to locate the cut-off along any vertical segment of the screen.

In practice, for obvious economic requirements, the number of detectors and the electronic apparatus for processing the resulting electric signals must be reduced to a minimum, and the cut-off must be determined in a manner corresponding as closely as possible to its real position.

All the devices known hitherto are relatively complex and expensive, since they usually search for the point at which the second or third derivative of the light intensity with respect to height becomes equal to zero. It may be assumed, for example, that the second derivative is zero at the cut-off, corresponding mathematically to a point of inflexion on the intensity/height curve.

The invention provides a method and device for determining the cut-off by means of photoelectric detectors, in a manner which is much simpler and much more efficient than the prior-art devices.

SUMMARY OF THE INVENTION

The invention is based on the experimental analysis of a large number of cut-offs obtained with different kinds of headlamps. The analysis has shown that the cut-off position can be very simply defined as the direction (or position on the screen) C such that the corresponding intensity $I_C$ can be expressed by the following relation:

$$I_C = a I_l + b \qquad (1)$$

in which $I_l$ is the intensity below C in a direction making a given angle $\alpha$ with the cut-off direction C, and $a$ and $b$ are given parameters.

If the headlamps use lamps having a power between 40 and 60 W and the angle $\alpha$ is equal to 1°, coefficient $a$ is substantially equal to 0.15 and coefficient $b$ is equal to 500, if the intensities are evaluated in candelas.

According to one aspect of the present invention a method of determining the position of the cut-off of the light beam for a motor vehicle headlight comprises: projecting the beam towards a first light detecting system $D_c$ and a second light detecting system $D_l$ located below the first system $D_c$, the systems $D_c$ and $D_l$ providing signals corresponding to the light intensities $I_c$ and $I_l$ respectively incident thereon, and the distance between the systems $D_c$ and $D_l$ subtending an angle $\alpha$ at the headlight;

and making a search for the position of the detecting systems relative to the beam at which the light intensities $I_c$ and $I_l$ satisfy relation $$I_c = aI_l + b$$

where $a$ and $b$ are given parameters such that when the said relation is satisfied, the position of the cut-off is indicated by the position of the detecting system $D_c$.

According to another aspect of the invention a device for determining the position of the cut-off of the light beam from a vehicle headlight comprises: a first light detecting system $D_c$ and a second light detecting system $D_l$ located below the first system $D_c$, the systems $D_c$ and $D_l$ providing signals corresponding to the light intensities $I_c$ and $I_l$ respectively incident thereon, and the distance between the systems $D_c$ and $D_l$ subtending an angle $\alpha$ at the headlight;

and means for comparing the signals provided by the systems $D_c$ and $D_l$ to provide an indication when the light intensities $I_c$ and $I_l$ satisfy the relation $$I_c = aI_l + b$$

where $a$ and $b$ are given parameters such that the detecting system $D_c$ is substantially at the cut-off when the said relation is satisfied. Each detecting system may comprise either a single photoelectric cell or a number of cells. Means may be provided for combining the signals produced by the detecting systems $D_c$ and $D_l$ in suitable proportions to produce a derived signal corresponding to $$I_c - aI_l$$

the combining means also displaying the derived signal, whereby equality of the derived signal and the parameter $b$ provides an indication that the detecting system $D_c$ is substantially at the cut-off. Preferably, the detecting systems $D_c$ and $D_l$ have sensitivities in the ratio $1:a$, and the signals produced by the detecting systems are directly combined to produce the derived signal. Since the sensitivity of a photoelectric detector, expressed e.g. in volts per lux, is a ratio between the electrical signal appearing at the detector output and the amount of illumination present at its input, no other scaling of the signals is needed.

DESCRIPTION OF THE DRAWINGS

The invention may be carried into practice in various ways, but two specific embodiments will now be described, by way of example with reference to the accompanying drawings, in which.

DESCRIPTION OF THE PREFERRED EMBODIMENTS

Figure 1:
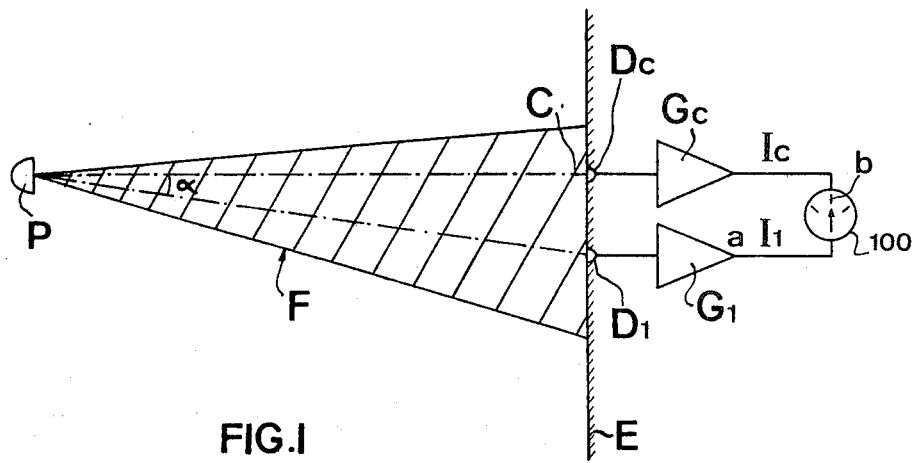
FIG. 1 is a diagram illustrating the working of the invention and showing a headlamp P in vertical section, projecting a beam on a transverse screen E.

In FIG. 1, which is in a vertical plane V, a cut-off beam F from a headlamp P is projected on to a screen E. According to the invention, screen E is associated with two photoelectric detectors $D_c$ and $D_l$ disposed along a vertical line on V and receiving light intensities $I_c$ and $I_l$. The electric signals from $D_c$ and $D_l$ are suitably amplified in amplifiers $G_c$ and $G_l$ respectively, the amplifier gains being in the ratio $a$, so that the electrical signal from $G_c$ varies with $I_c$ and the signal from $G_l$ varies with $I_l$ (the detecting systems $D_c$, $G_c$ and $D_l$, $G_l$ have a sensitivity ratio equal to $a$).

The signals from $G_c$ and $G_l$ are compared in a comparator 100 which displays the result of subtraction $I_c - a I_l$. The beam F is displaced with respect to screen E (either by moving the screen, or preferably by moving the beam by adjusting the headlamp P), so as to find the cut-off C in accordance with the information displayed by the comparator 100. The cut-off C coincides with detector $D_c$ when the comparator displays a value corresponding to parameter $b$ in equation (1).

Although only brief information has been given about detectors $D_c$ and $D_l$, the skilled reader will be able to use any available photoelectric detecting systems which provide an electric voltage or current output signal. Comparator 100, which shows the difference between $I_c$ and $a I_l$, can e.g. be a needle galvanometer, the galvanometer scale having a zero mark at the point corresponding to a difference of $b$. For display purposes, use may advantageously be made of signal lamps indicating "higher" or "lower" and thus showing the direction in which the headlamp must be adjusted to find the cut-off.

Figure 2:
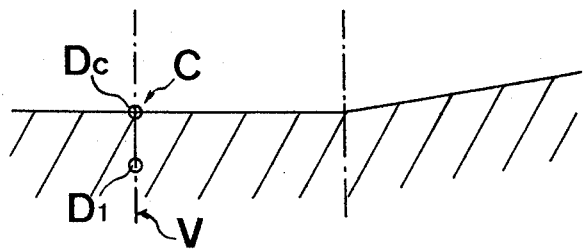
FIG. 2 is a front view of screen E in FIG. 1.
Figure 3:
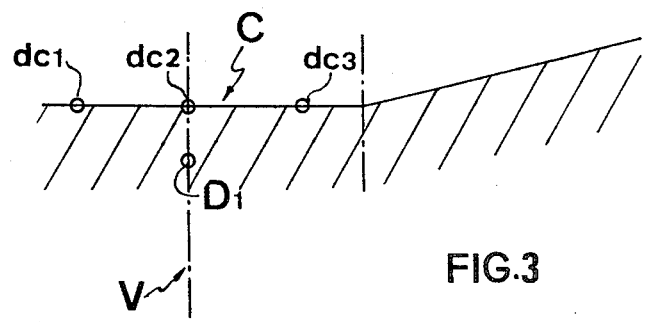
FIG. 3 is a view corresponding to FIG. 2, of a different embodiment.

Of course, the embodiment in FIGS. 1 and 2 is given by way of example only. Many other embodiments are possible. More particularly (FIG. 3), the detector system $D_c$ can be made up of a number of photosensitive elements $d_{c1}$, $d_{c2}$, $d_{c3}$ to obtain a mean output signal which is compared with the output signal of a detector system such as $D_l$. In other words, each detector system can comprise one or more detector cells suitably distributed for obtaining the most representative mean (or weighted) signal.

As already explained, devices according to the invention can form the main component of devices for checking and adjusting headlamps, either at the factory or in a service station.

What I claim as my invention and desire to secure by Letters Patent is:

1. A method of adjusting the vertical position of the cut-off plane of a motor vehicle headlamp, comprising the steps of:

(a) providing an upper light detection system and a lower light detection system, each light detection system including a photosensitive device, the photosensitive devices being vertically spaced apart a fixed distance, and each light detection system providing a signal representative of the intensity of light impinging upon it, the value of the signals produced by the two light detection systems in response to the same intensity light impinging upon them differing from each other by a fixed ratio substantially unequal to one, (b) providing a comparator for comparing the signals from the light detection systems and giving a visual indication of the difference between them, (c) arranging a headlamp at a predetermined horizontal distance from at least one of the photosensitive devices and directing light from the headlamp at the devices, (d) moving the photosensitive devices and the headlamp in a vertical direction relative to each other, and (e) stopping the movement when the comparator indicates a difference of a particular predetermined value, that predetermined value being achieved only when the cut-off plane of the headlamp intersects the upper photosensitive device.

2. A method as defined in claim 1 wherein the photosensitive devices are photoelectric cells.

3. A method as defined in claim 1 including the step of providing a vertical screen upon which the photosensitive devices are mounted.

4. A method as defined in claim 1 wherein the headlamp has a power of 40 to 60 watts, the distance between the photosensitive devices and the distance between the headlamp and the plane containing the devices are such that the angle between lines drawn from the headlamp to each of the two devices is substantially equal to one degree, the fixed ratio is 0.15, and the particular predetermined difference between the value of the signal from the upper system and the value of the signal from the lower system is 500 when the light intensity is measured in candelas.

5. An apparatus for determining the position of the cutoff plane of a motor vehicle headlamp, comprising:

(a) an upper light detection system and a lower light detection system, each light detection system providing a signal representative of the intensity of light impinging upon it, the value of the signals produced by the two light detection systems in response to the same intensity light impinging upon them differing from each other by a fixed ratio substantially unequal to one, and each light detection system including a photosensitive device,
(b) means supporting said photosensitive devices vertically spaced apart a fixed distance, and
(c) comparator means for comparing the signals from said light detection systems and giving a visual indication representative of the difference between the signals, said comparator indicating a difference of a particular predetermined value when the cut-off plane of a headlight intersects the upper photosensitive device.

6. An apparatus as defined in claim 5 wherein each of said photosensitive devices produces a signal in response to light inpinging upon it, and each of said light detection systems includes an amplifier for amplifying the signal from its respective photosensitive device, the amplified signal being applied to said comparator, the ratio of the gains of said amplifiers being said fixed ratio.

7. An apparatus as defined in claim 5 wherein said photosensitive devices are photoelectric cells.

8. An apparatus as defined in claim 5 wherein said means for supporting said photosensitive devices is a vertical screen.

* * * * *